Figure 1:
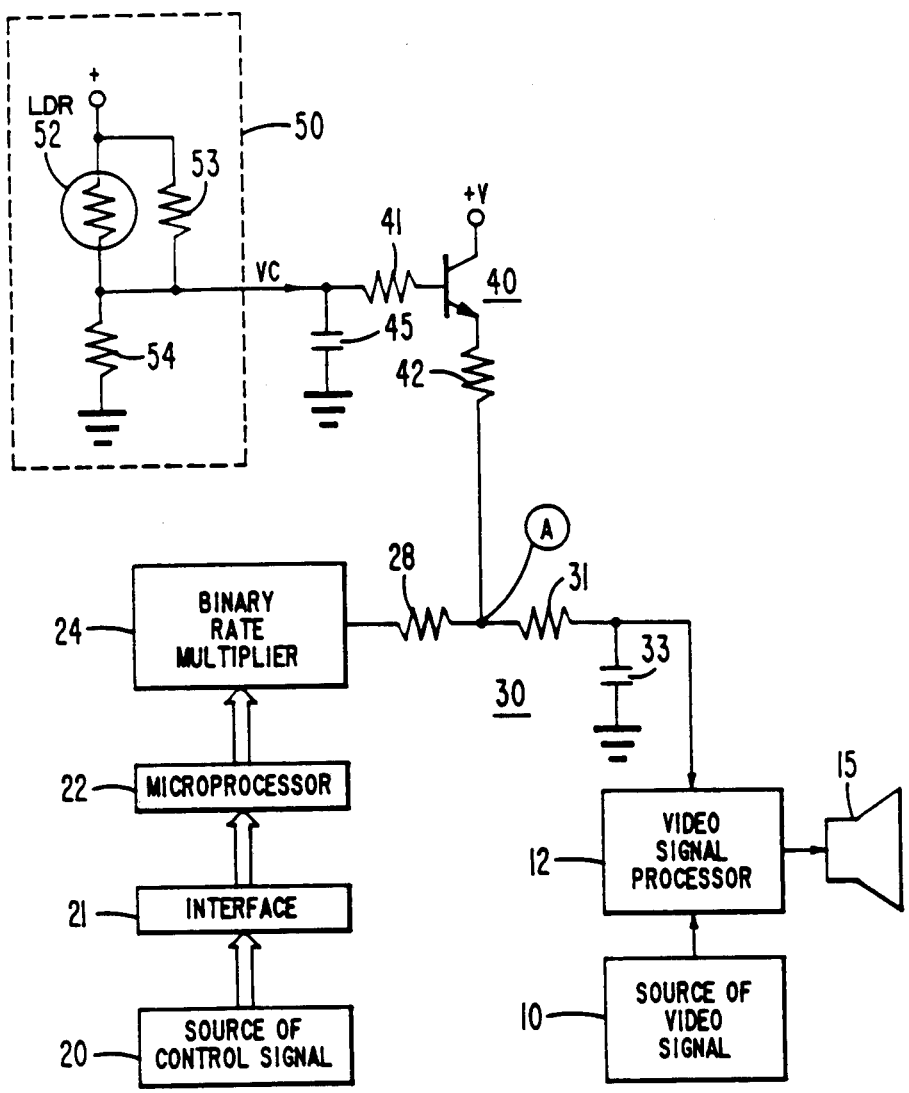

United States Patent [19]

Stoughton et al.

[11] Patent Number: 4,799,107
[45] Date of Patent: Jan. 17, 1989

[54] AUXILIARY GAIN CONTROL APPARATUS FOR A TELEVISION RECEIVER

[75] Inventors: John W. Stoughton, Indianapolis; Charles B. Neal, Zionsville, both of Ind.

[73] Assignee: RCA Licensing Corporation, Princeton, N.J.

[21] Appl. No.: 34,444

[22] Filed: Apr. 6, 1987

[51] Int. Cl.⁴ .................. H04N 5/208; H04N 5/57
[52] U.S. Cl. ..................................... 358/169; 358/161
[58] Field of Search ............... 358/161, 169, 162, 168

[56] References Cited

U.S. PATENT DOCUMENTS

| | | |
|---|---|---|
| 3,928,867 | 12/1975 | Lynch ................................. 358/161 |
| 4,090,216 | 5/1978 | Constable ........................... 358/161 |
| 4,451,849 | 5/1984 | Fuhrer ................................ 358/161 |
| 4,511,921 | 4/1985 | Harlan et al. ...................... 358/161 |
| 4,573,069 | 2/1986 | Lewis, Jr. .......................... 358/27 |
| 4,633,320 | 12/1986 | Willis ................................. 358/243 |

Primary Examiner—Tommy P. Chin
Attorney, Agent, or Firm—Paul J. Rasmussen; Peter M. Emanuel; Ronald H. Kurdyla

[57] ABSTRACT

In a television receiver, an output signal from a binary rate multiplier (BRM) is used to control the amplitude of a video signal and thereby the contrast of a displayed image. Contrast control in response to ambient lighting conditions is accomplished by means of a light dependent resistor which modifies the output pull-up voltage of the BRM.

6 Claims, 2 Drawing Sheets

AUXILIARY GAIN CONTROL APPARATUS FOR A TELEVISION RECEIVER

This invention concerns apparatus for controlling the magnitude of a video signal processed by a video signal processor which employs digital control systems.

Video signal processing systems such as television receivers are increasingly using digital video signal processing and digital control techniques. It is often advantageous to use digital control systems in a television receiver even though the receiver does not employ digital video signal processing. Digital control systems can be implemented in a variety of ways, such as by means of binary rate multipliers (BRM), e.g., the type CD4089B BRM commercially available from the Solid State Division of RCA Corporation, or the type SN5497 BRM commercially available from Texas Instruments Corporation.

As disclosed herein, in a preferred embodiment of the invention a television receiver advantageously uses a BRM to control the magnitude of a video signal to control the contrast of a displayed image, for example. As is the case with many television receivers, it is desirable to provide additional control of the contrast of a displayed image in response to ambient lighting conditions. To this end receivers typically include an ambient light sensing device such as a light dependent resistor (LDR) coupled to a contrast control circuit. In accordance with a feature of the invention, additional control of image contrast in response to ambient lighting conditions is accomplished by means of an LDR which modulates the output pull-up voltage of the BRM in response to varying ambient lighting conditions.

In the drawing

Figure 2:
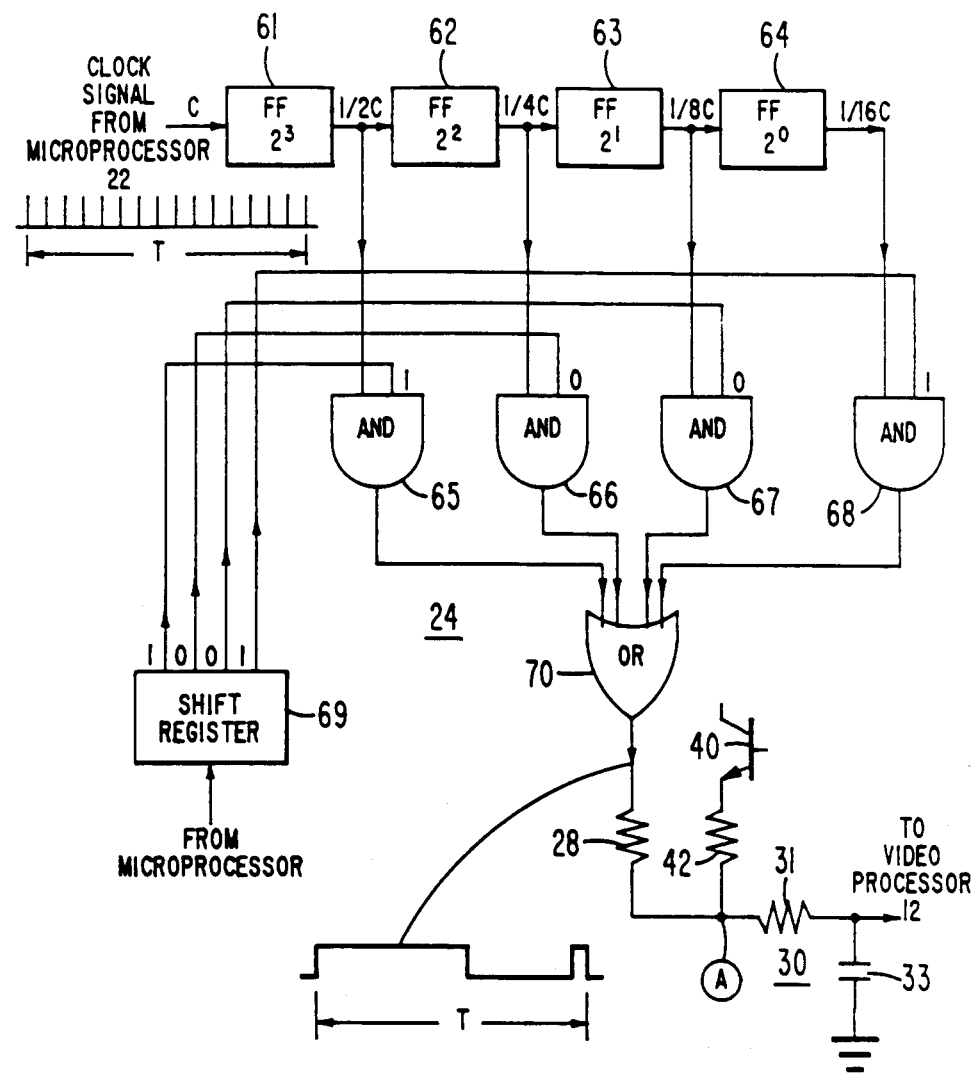

FIG. 1 shows a portion of a television receiver video signal processing system including contrast control apparatus in accordance with the present invention; and FIG. 2 shows circuit details of a portion of the apparatus of FIG. 1.

In FIG. 1, a video signal is provided from a source 10 to a video signal processor 12 which amplifies the video signal to a magnitude suitable for driving an image displaying kinescope 15. The peak-to-peak amplitude of the video signal, and hence the contrast of a displayed image, is ultimately controlled in response to a control signal from a source 20. In this example source 20 constitutes part of a viewer operated remote control unit. In response to a viewer selected contrast level, source 20 transmits a coded signal in binary form which is received by an interface unit 21 attached to the receiver. When source 20 is an infrared remote control unit for example, interface 21 translates the binary signal which is received in the form of infrared light to an electrical signal, also in binary form, suitable for processing by a microprocessor 22. Interface unit 21 formats the received binary signal into an N-bit serial or parallel binary signal containing coded information which provides microprocessor 22 with suitable instructions for incrementing or decrementing the memory value for the contrast function.

Microprocessor 22 provides an N-bit binary signal output to a binary rate multiplier (BRM) 24 of known configuration. BRM 24 will be discussed in greater detail in connection with FIG. 2. A binary output signal from BRM 24 is conveyed via a resistor 28 and an integrating or low pass filter network 30 including a resistor 31 and a filter capacitor 33. The output signal from BRM 24 comprises substantially constant amplitude pulses with a pulse width (duty factor) determined by the contrast control information supplied from microprocessor 22. The duty factor of the pulse signal produced by BRM 24 determines the DC voltage produced across capacitor 33 when the output pulse signal of BRM 24 is integrated by circuit 30, which DC voltage is applied to a contrast control (gain control) input of video processor 12 to control the magnitude of the video signal, and thereby to control the contrast of a reproduced image.

The use of a BRM (or a pulse width modulator) facilitates the use of a digital control system for gain control purposes and advantageously avoids the need for relatively expensive gain control potentiometers. Also, factory preset adjustments can be readily and inexpensively implemented simply by programming memory locations associated with a certain function with desired values.

The value of resistor 28 is chosen to set a lower contrast control range limit and to limit the output current of BRM 24. The value of resistor 31 is chosen to provide appropriate low pass filtering of the BRM output signal, in combination with capacitor 33. The charge and discharge time constants of capacitor 33 are primarily determined by the value of resistor 31. The value of resistor 28 also influences the discharge time constant. The charging time constant of capacitor 33 as determined by the values of resistors 31 and 42, and the discharging time constant as determined by the values of resistors 28 and 31, preferably should be substantially equal or within 10% of each other. This typically requires that the value of resistor 31 be significantly larger than the values of resistors 28 and 42.

Auxiliary contrast (gain) control in response to ambient lighting conditions is provided by a network including a voltage source 50, a filter capacitor 45, a resistor 41, an emitter follower transistor 40, and a pull-up resistor 42. Source 50 includes a variable impedance network with an ambient light responsive light dependent resistor (LDR) 52 and resistors 53 and 54 arranged as a voltage divider between a source of positive DC operating potential (+) and ground reference potential. LDR 52 is positioned close to the display screen of kinescope 15 so that the amount of ambient light striking LDR 52 is proportional to the amount of light striking the kinescope display screen.

A contrast control voltage VC from source 50 varies in accordance with the impedance of LDR 52, which in turn varies with the intensity of ambient light. Control voltage VC is conveyed via resistor 41, follower transistor 40 and resistor 42 to a node A at which the BRM output signal appears. Control voltage VC modifies the DC component of the BRM output signal in response to ambient lighting conditions, thereby providing an auxiliary means of controlling the contrast of a displayed image in response to ambient lighting conditions.

The value of resistor 53 is selected to control the amount of change in image contrast that is produced for a given change in the resistance of LDR 52. Specifically, resistor 53 desensitizes LDR 52 so that a smaller change in contrast is produced for a given change in ambient light intensity. Resistor 42 is a pull-up resistor for the output of BRM 24, and is connected between node A and the low impedance emitter of transistor 40, which represents both a low impedance source of pull-up voltage for BRM 24 and a source of auxiliary contrast control voltage.

Source 50 is positioned close to the display screen of kinescope 15, and is attached to the front of the television cabinet. The other elements of FIG. 1 (with the exception of kinescope 15) are located on a main signal processing circuit board within the receiver cabinet. Thus voltage VC from source 50 is conveyed to the main circuit board via a relatively long wire, e.g., several inches long. The use of such a long length of connecting wire could create problems if LDR 52 were used as the pull-up resistor, i.e., directly connected to point A, due the likely radiation of interference components attributable to harmonics of the square-wave type pulsed output signal of BRM 24. This problem is avoided with the disclosed coupling arrangement including low output impedance follower transistor 40, since the relatively long wire connecting LDR unit 50 to the main circuit board advantageously conveys only DC information (voltage VC).

FIG. 2 shows additional details of BRM 24 in FIG. 1.

In FIG. 2 a periodic clock timing signal C (e.g., 1 MHz) from microprocessor 22 is applied to an input of a divide-by-two flip-flop 61 which is cascaded with similar flip-flops 62–64. As indicated by the input waveform, clock signal C comprises a series of sixteen periodic pulses within an illustrative interval T. Frequency divided versions of clock signal C are coupled from outputs of flip-flops 61–64 to respective first inputs of AND logic gates 65, 66, 67 and 68. Respective second inputs of AND gates 65–68 receive a binary signal from respective outputs of a shift register 69. The binary signals from the outputs of shift register 69 represent a contrast control signal (1001) as provided by microprocessor 22 in response to a contrast control command received from contrast control source 20 in FIG. 1.

Binary output signals from gates 65–68 are coupled to respective inputs of an OR logic gate 70. A binary output signal from OR gate 70, produced in response to the illustrated binary contrast control signal (1001), is indicated by the waveform. Compared to periodic, clock signal C, the output signal from OR gate 70 constitutes a uniform amplitude pulse signal with a duty factor determined by the binary contrast control signal from shift register 69. The output signal from OR gate 70 represents a DC component which is a function of the contrast control information in the binary signal from shift register 69, as modified at node A by auxiliary contrast control DC information related to ambient light conditions as explained earlier. The DC value of the signal at node A is recovered for contrast control purposes by means of integrator 30. The output signal of BRM 24, when integrated over time by circuit 30, provides a DC voltage across capacitor 33 in accordance with the expression $$\frac{N}{2^n} \times VP$$

where "N" is the output number of the BRM (the number of pulses per unit of time), "n" is the number of binary bit stages of the BRM (four in this example), and "VP" is the magnitude of the pull-up voltage at the emitter of transistor 40. N can vary between 0 and $2^n$, or between 0 and 16 in the case of illustrated 4-bit BRM 24. BRM 24 provides an output pulse rate that is clock-input-pulse rate multiplied by 1/16 times the binary input. For example, when the binary input number (from shift register 69 via microprocessor 22) is 13, there will be 13 output pulses for every 16 input pulses.

For additional information in this regard see the technical data sheet for the type CD4089B binary rate multiplier, commercially available from the Solid State Division of RCA Corporation.

The information content of the binary output signal of shift register 69 remains unchanged until a contrast change command is made by the viewer. Thus for a given contrast control setting the binary output signal (e.g., 1001) of register 69 appears continuously and is ultimately converted to a corresponding DC contrast control voltage by integrator 30. When the viewer initiates a contrast change, microprocessor 22 provides new contrast information to register 69 such that a new binary output signal appears (e.g., 1101) and remains until the next contrast control change is made.

A change in the pull-up voltage (at the emitter of transistor 40) due to an ambient light variation advantageously produces a predictable corresponding contrast change for any given BRM output signal. For example, a 50% change in the magnitude of the pull-up voltage will produce a 50% change in image contrast regardless of the form (i.e., duty cycle) of the BRM output signal.

What is claimed is:

1. In a video signal processing system including an image display device having a viewing screen, apparatus comprising:

video signal processing means having a signal input for receiving a video signal, a control input for receiving a gain control signal to control the magnitude of said video signal, and an output coupled to said image display device;

translating means responsive to a clock timing signal and responsive to an input binary signal representative of a desired magnitude of said video signal, for providing at an output an output binary signal with a substantially constant amplitude and with a duty factor determined by said input binary signal, said duty factor representing a DC value of said output binary signal;

means for conveying a DC signal derived from said output binary signal to said control input of said video signal processing means;

ambient light responsive variable conduction means positioned with respect to said viewing screen such that substantially proportional amounts of ambient light strike said ambient light responsive means and said viewing screen; and means for coupling said ambient light responsive means to said output of said translating means without influencing said input binary signal, for modifying said DC signal in response to ambient light conditions.

2. Apparatus according to claim 1, wherein
   said translating means is a binary rate multiplier; and
   said conveying means includes a low pass filter.

3. Apparatus according to claim 1, wherein
   said ambient light responsive variable condition means is a light dependent resistor coupled to a voltage source, for developing an output voltage with a magnitude in accordance with said ambient light conditions; and
   said coupling means includes an impedance network for coupling said output voltage to said output of said translating means.

4. Apparatus according to claim 3, wherein said impedance network includes a pull-up resistor having a first end coupled to said output of said translating means, and a second end; and a semiconductor device having an input for receiving said output voltage, and an output for conveying said output voltage to said second end of said pull-up resistor as a pull-up voltage for said pull-up resistor.

5. Apparatus according to claim 4, wherein said semiconductor device is an emitter follower transistor.

6. Apparatus according to claim 3, wherein said impedance network is located proximate to said output of said translating means;

said ambient light responsive variable conduction means is located relatively distant from said translating means; and a conductor connecting said impedance network to said ambient light responsive variable conduction means conducts substantially only DC current.

* * * * *